United States Patent [19]
Shiraishi

[11] Patent Number: 4,832,547
[45] Date of Patent: May 23, 1989

[54] BREAKING TYPE EXPANSION FASTENER

[75] Inventor: Toshiyuki Shiraishi, Yokohama, Japan

[73] Assignee: Nifco Inc., Yokohama, Japan

[21] Appl. No.: 95,754

[22] Filed: Sep. 11, 1987

[30] Foreign Application Priority Data

Sep. 26, 1986 [JP] Japan .......................... 61-146545[U]

[51] Int. Cl.⁴ ............................................. F16B 13/04
[52] U.S. Cl. ........................................ 411/42; 411/39; 411/48; 411/60
[58] Field of Search ..................................... 411/39–43, 411/44, 45, 48, 57, 60

[56] References Cited

U.S. PATENT DOCUMENTS 4,276,806 7/1981 Morel ..................................... 411/41
4,375,342 3/1983 Wollar et al. ......................... 411/41
4,637,765 1/1987 Omata ................................... 411/41

FOREIGN PATENT DOCUMENTS 61-166212 10/1986 Japan .

Primary Examiner—Neill R. Wilson
Attorney, Agent, or Firm—Richard Bushnell

[57] ABSTRACT

An expansion fastener comprises a female member including a cylindrical portion, a flange portion and a plurality of elastic leg portions, and a male member including a shaft portion to be fitted in the cylindrical portion, a head portion provided at the upper end of the shaft portion and a leg portion expanding portion for causing outward deformation of the elastic leg protions. The cylindrical portion of the female member has a reduced-thickness break portion which extends along an overlap plane along which two plates overlap each other, and a radially inwardly constricted break portion is provided between the shaft portion and head portion of the male member.

2 Claims, 6 Drawing Sheets

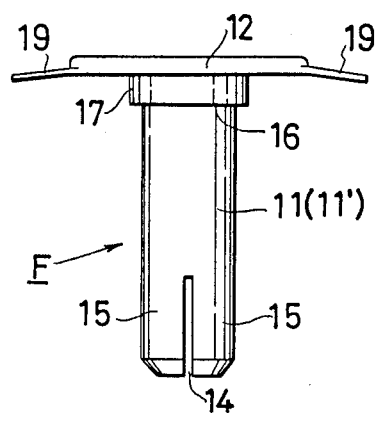
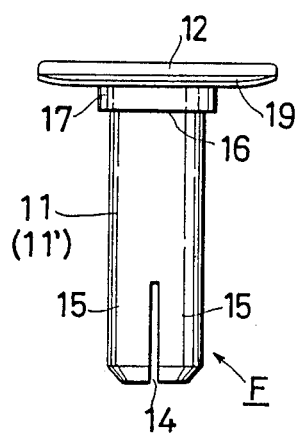
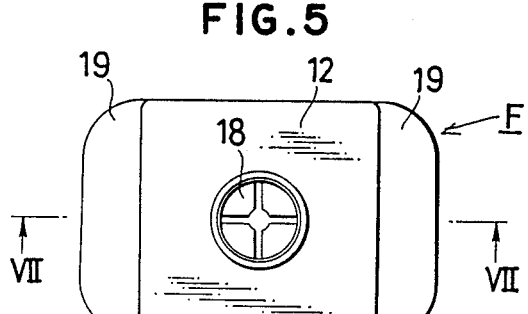
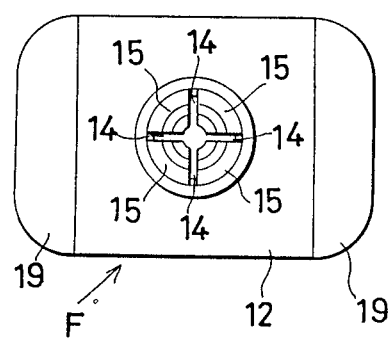
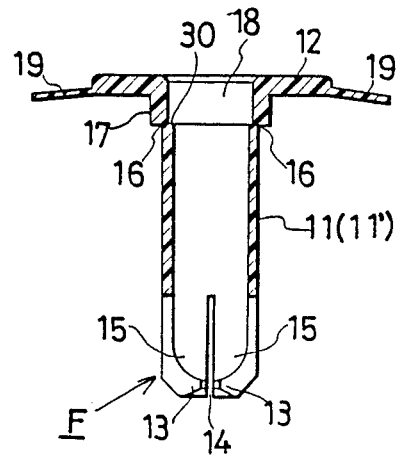

BREAKING TYPE EXPANSION FASTENER

BACKGROUND OF THE INVENTION

1. Field of the Invention

This invention relates to an expansion fastener consisting of a female member and a male member for fastening together two metal or plastic plates or sheets in an overlapped state. More particularly, the invention relates to a fastener of the type noted, in which the male and female members are broken apart at an intermediate position of their length to release the overlapped state of the two plates when one thereof experiences an external impact force.

2. Prior Art Statement

An expansion fastener, which comprises a female member including a cylindrical portion, a flange portion extending radially outwardly from the upper end of the cylindrical portion and a plurality of elastic leg portions defined by radially spaced slits and each having a radially inward projection projecting from the lower end of the cylindrical portion, and a male member including a shaft portion passing through the cylindrical portion of the female member, a head portion extending radially outwardly from the upper end of the shaft portion and an enlarged diameter portion extending radially outwardly from lower portion of the shaft portion and functioning, when the head portion is substantially aligned with the upper surface of the flange portion of the female member, to engage the projections of the lower ends of elastic leg portions of the female member to cause radially outward deformation of the elastic leg portions, is well known in the art (as disclosed in, for instance, Japanese Utility Model Publication No. 61-166212).

When an impact force acts on one of two plates fastened together in an overlapped state by this fastener, the relative movement of the plates is resisted by the fastener, thus causing deformation or rupture of the plates. In other words, the fastener gives rise to various troubles depending on the deformation of the plates.

For example, with reference to FIG. 1, when a bumper face 3 and a reinforcement 4 of an upper portion of an automobile front bumper 2 are secured together by a prior art fastener 1, at the time of impact the bumper face 3 strikes the lower end of a body panel 5 and causes deformation thereof as shown by phantom lines in FIG. 1. In this case, part of the body is broken. Therefore, i is necessary to replace the front bumper 2 and repair the body panel 5, which results in high repair cost. In the Figure, reference numeral 6 designates a urethane member and numeral 7 a front grille.

OBJECT AND SUMMARY OF THE INVENTION

An object of the invention is to provide an expansion fastener, in which, when a strong impact force in excess of a predetermined level is exerted on one of two plates fastened together in an overlapped state by it, the state of fastening of the plates is released to prevent deformation of the plates.

To attain the above object of the invention, there is provided an expansion fastener which comprises a female member including a cylindrical portion, a flange portion and a plurality of elastic leg portions, and a male member including a shaft portion to be fitted in the cylindrical portion, a head portion provided at the upper end of the shaft portion and a leg portion expanding portion for causing outward deformation of the elastic leg portions, and in which the cylindrical portion of the female member has a reduced-thickness break portion which extends along an overlap plane along which two plates overlap each other, and a radially inwardly constricted portion is provided between the shaft portion and the head portion of the male member.

The above and other objects and features of the invention will become more apparent from the following detailed description with reference to the accompanying drawings.

BRIEF DESCRIPTION OF THE DRAWINGS

FIG. 3 is a front view showing a female member of the fastener shown in FIG. 2;

FIG. 4 is a side view showing the same female member;

FIG. 5 is a plan view showing the same female member;

FIG. 6 is a bottom view showing the same female member;

FIG. 7 is a sectional view taken along line VII—VII in FIG. 5.

DETAILED DESCRIPTION OF THE PREFERRED EMBODIMENT

Figure 1:
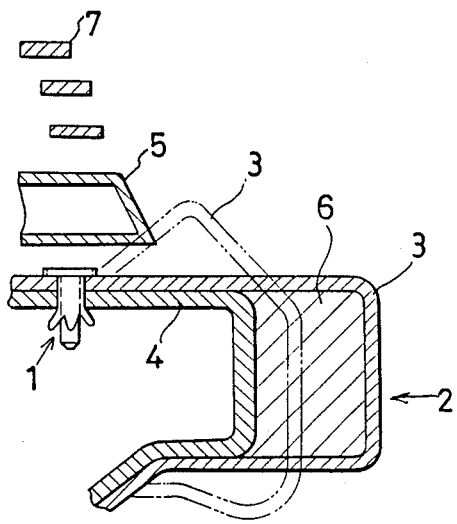
FIG. 1 is a view showing two plates fastened together overlapped state by a prior art fastener.

Referring to the Figures, reference numeral 10 designates an expansion fastener consisting of a female member F and a male member M. Both the female and male members F and M are plastic one-piece moldings.

The female member F is shown in detail in FIGS. 3 to 7. As is shown, it has a cylindrical portion 11, a flange portion 12 extending radially outwardly from the upper end of the cylindrical portion 11 and a plurality of elastic leg portions 15 defined by radially spaced slits 14 and each having a radially inward projection 13.

Figure 17:
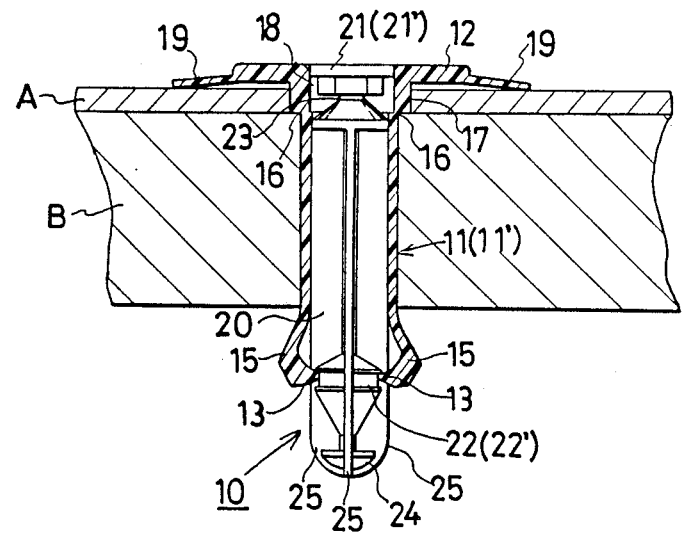
FIG. 17 is a sectional view showing two plates fastened together by the fastener according to the invention.

The cylindrical portion 11 has a tapered end. It has a break portion 16 provided at an intermediate portion of its length and adapted to extend along the overlap surface along which two plates to be fastened are overlapped. In this embodiment, an increased diameter collar portion 17 of short length and large thickness is provided under the flange portion 12 such that the inner edge of the lower end of the increased diameter collar portion 17 and the outer edge of the upper end of the cylindrical body 11' under the increased diameter collar portion 17 are united in an offset fashion through the break portion 16 which is actually a ring-like portion having a small thickness. The break portion 16 is preferably provided at a position below the flange portion 12 and spaced apart from the same to an extent substantially equal to the thickness of the upper plate A (FIG. 17).

The flange portion 12 extends from the open upper end of the cylindrical portion 11 substantially in a rectangular form. Its central portion has a vertical circular opening 18. Its opposite ends have elastic contact pieces 19 which extend obliquely downwardly.

The elastic leg portions 15 are defined by the four radially spaced slits 14 as described above. The slits 14 preferably have a length which is small compared to the height of the cylindrical portion 11 so that they will not reach the break portion 16.

The male member M is shown in detail in FIGS. 8 to 13. As is shown, it has a shaft portion 20 for passing into the cylindrical portion 11 of the female member F, a head portion 21 extending radially outwardly from the upper end of the shaft portion 20 and a leg portion expanding portion 22 functioning, when the head portion 21 is substantially aligned with the upper surface of the flange portion 12 of the female member F, to engage with the projections 13 at the lower end of the elastic leg portions 15 of the female member F to cause radially outward deformation of the elastic leg portions 15.

The shaft portion 20 is united to the head portion 21 via a radially inwardly constricted break portion 23. The lower end of the shaft portion 20 is provided with a downwardly conically tapered portion 24 having four ribs 25 radially extending from a core portion 20'. The ribs 25 have a thickness corresponding to the width of the slits 14 of the female member F. The ribs 25 extend from the core portion 20' to such an extent that they can make frictional contact with the slits 14.

The leg portion expanding portion 22 consists of portions each having a sectional shape of substantially a quarter of a circle and each is provided between a pair of adjacent ribs 25. Each quarter-circle surface of the expanding portion 22 is preferably provided with a groove 22' extending in the circumferential direction.

On the expanding portion 22 is provided a conical portion 26, which tapers obliquely, the conical portion 26 has portions each subtending substantially a quarter of a circle and each being provided between a pair of adjacent ribs 25. Above the conical portion 26, there are formed upper recesses 27 along which the projections 13 are moved. Under the expanding portion 22 there is formed an inverted conical portion 28, which tapers comparatively gently. The inverted conical portion 28 has portions each subtending substantially a quarter of a circle and each being provided between an adjacent pair of ribs 25. Between the lower end of the inverted conical portion 28 and the conically tapering portion 24 there is provided a lower recess 29, in which the projections 13 are accommodated without spreading the elastic leg portions 15.

The head portion 21 is in the form of a short cylinder. The top of the head portion 21 is provided with a flange 21', the outer diameter of which is made substantially the same as the inner diameter of the opening 18 of the flange portion 12 of the female member F.

Figure 2:
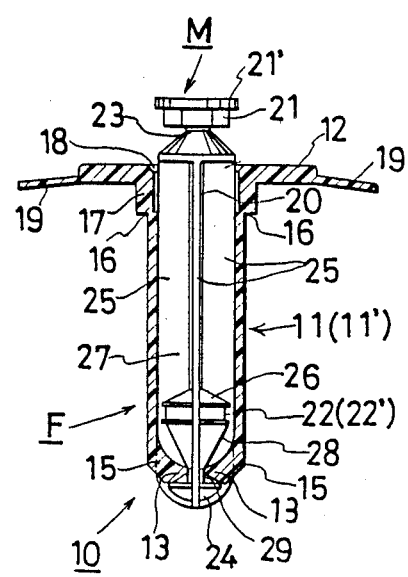
FIG. 2 is a sectional view showing an embodiment of the fastener according to the invention.
Figure 8:
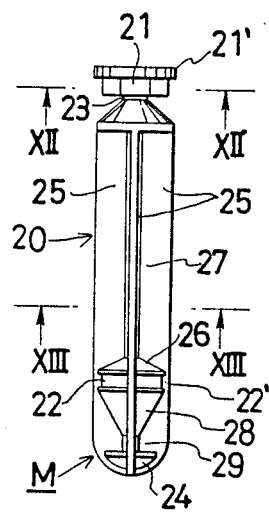
FIG. 8 is a front view showing a male member of the fastener shown in FIG. 2.
Figure 9:
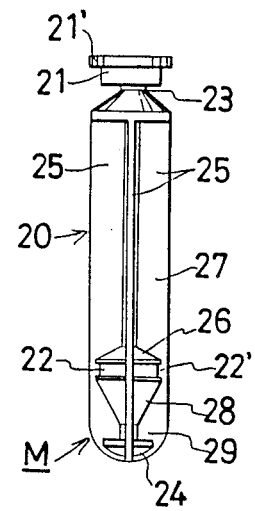
FIG. 9 is a side view showing the same male member.
Figure 10:
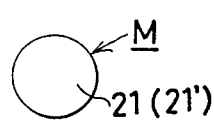
FIG. 10 is a plan view showing the same male member.
Figure 11:
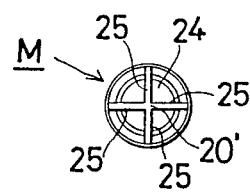
FIG. 11 is a bottom view showing the same male member.
Figure 12:
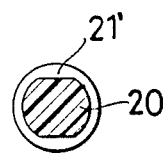
FIG. 12 is a sectional view taken along line XII—XII in FIG. 8.
Figure 13:
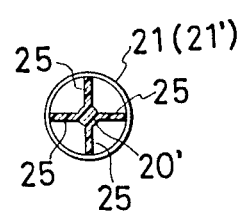
FIG. 13 is a sectional view taken along line XIII—XIII in FIG. 8.
Figure 14:
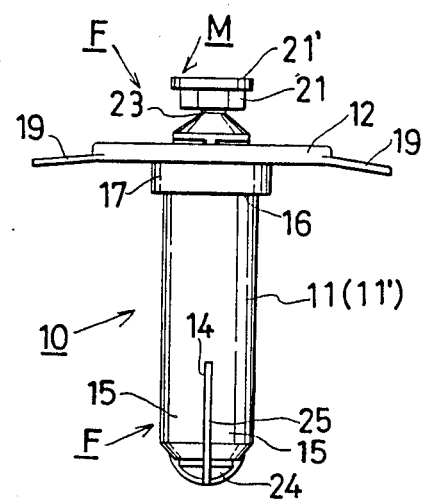
FIG. 14 is a front view showing the female and male members in the assembled state.
Figure 15:
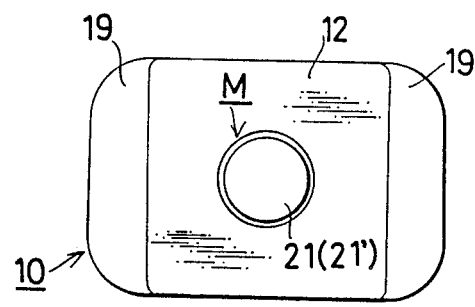
FIG. 15 is a plan view showing the female and male members in the assembled state.
Figure 16:
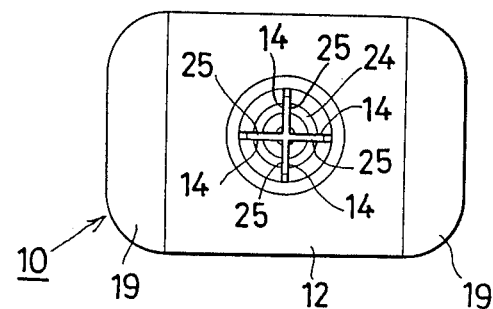
FIG. 16 is a bottom view showing the female and male members in the assembled state.

The fastener is used by inserting the end portion of the male member M from above into the opening 18 of the flange portion 12 of the female member F with the ribs 25 of the male member M aligned with the slits 14 of the female member F. When the male member M is inserted, the edges of the ribs 25 are fitted in the slits 14. At the same time, the conically tapered portion 24 pushes the projections 13 of the elastic leg portions 15 from the inner side to cause radially outward flexing of the elastic leg portions 15 and clears the same. Consequently, the projections 13 of the elastic leg portions 15 are fitted in the recess 29 under the leg portion expanding portion 22, and the elastic leg portions 15 are restored to the initial state (FIGS. 2 and 14).

When the male member M is pulled upwardly in this state, the upper surface of the conically tapered portion 24 hooks on the lower end of the projection 13 of each elastic leg portion. Thus, the male member M can no longer be withdrawn. Further, since the ribs 25 are received in the slits 14, the female and male members F and M can be held in a temporarily assembled state without relative rotation with respect to each other.

To fasten together two plates A and B in an overlapped state, as shown in FIG. 17, the holes of the plates A and B are aligned, then the cylindrical portion 11 of the female member F is inserted until the lower surface of the flange portion 12 of the female member F comes into contact with the upper surface of the plate A, and the head portion 21 of the male member M is pushed into the cylindrical portion 11 of the female member F from above. When the upper surface of the head portion 21 of the male member M is substantially aligned with the upper open surface of the flange portion 12 of the female member F, the expanding portion 22 pushes the projections 13 of the elastic leg portions 15 from the inner side to cause radially outward flexing of the elastic leg portions 15, whereby the two plates A and B are urged against the lower surface of the flange portion 12 of the female member F and fastened together in an overlapped state.

Figure 18:
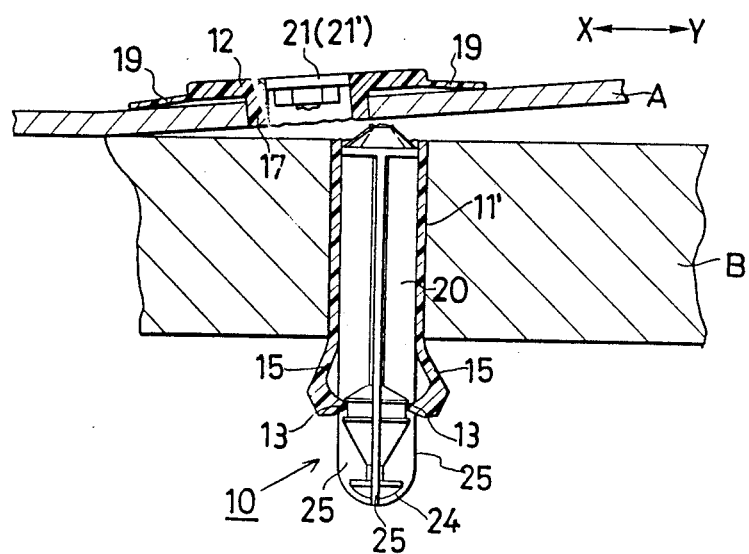
FIG. 18 is a sectional view sowing the fastener in the broke state.
Figure 19:
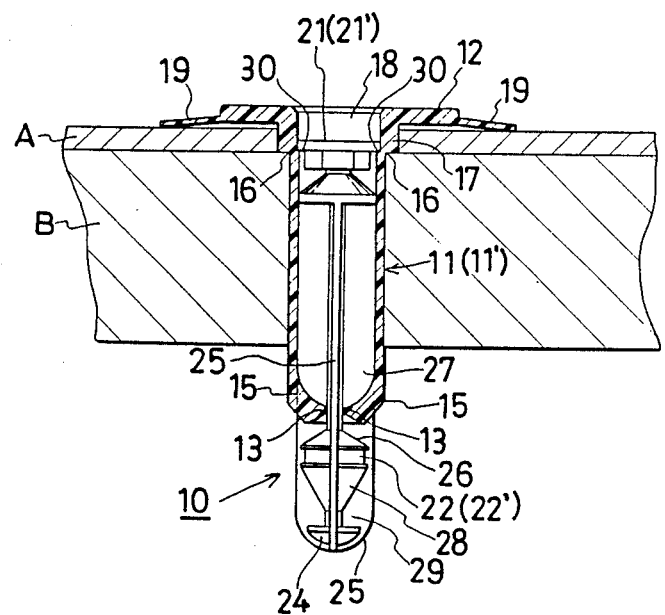
FIG. 19 is a sectional view showing the fastener releasing the fastened state of the plates.

When an impact force acts on one of the fastened plates, the two plates A and B are displaced in relatively opposite directions X and Y in FIG. 18, and the outer surface of the increased diameter collar portion 17 of the female member F and outer surface of the cylindrical body 11' under the increased diameter collar portion 17 are pushed in opposite directions by the edges of the holes of the plates A and B. Therefore, when this force exceeds a predetermined level, the small thickness break portion 16 between the increased diameter collar portion 17 and cylindrical body 11' is broken. Consequently, a laterally twisting force is applied to the constricted break portion 23 between the shaft portion 20 and head portion 21 of the male portion M, and the head portion 21 is broken at the break portion 23 such that it is separated from the shaft portion 20.

Thus, the plates A and B are released from the fastened state, so that the portion of the female member F above the break portion 16 is moved together with the head portion 21 of the male member M to the upper plate A, while the portion of the female member F below the break portion 16 is moved together with the shaft portion 20 of the male member M to the lower plate B. Since the slits 14 of the cylindrical portion 11 do not reach the break portion 16, the four elastic leg portions 15 are not broken at the slits 14 when the cylindrical portion 11 is broken at the break portion 16.

To release the securement of the plates A and B, the male member M may be deeply pushed into the cylindrical portion 11 of the female member F. As a result, the projections 13 of the elastic leg portions 15 are received in the upper side recesses 27 above the expanding portion 22, whereby the elastic leg portions 15 are restored to the initial reduced diameter state. When using this fastener 10 again, the fastener 10 is withdrawn from the holes of the plates A and B, and the male member M is pushed up relative to the cylindrical portion 11 of the female member F to restore the temporarily assembled state shown in FIG. 2.

The conical portion 26 above the expanding portion 22 quickly leads the projections 13 of the elastic leg portions 15 into the upper recesses 27. Also, when pushing up the male member M relative to the cylindrical portion 11 of the female member F for re-use, it quickly pushes apart the elastic leg portions 15 so that the projections 13 thereof can pass without being hooked in the grooves 22' of the expanding portion 22. When pushing up the male member M with respect to the cylindrical portion 11 of the female member F, the flange 21' of the head portion 21 of the male member M strikes a ring-like stepped portion 30 between the increased diameter collar portion 17 and the cylindrical body 11', thus preventing the male member M from being fitted unnecessarily deeply into the cylindrical portion 11 of the female member M.

As has been described in the foregoing, according to the invention, when a strong lateral impact force acts on one of the two plates, the cylindrical portion of the female member is broken at the break portion 16, while the shaft portion and head portion of the male member are broken at the break portion 23, whereby the two plates are released from the fastened state and allowed to move freely. For this reason, it is possible to prevent deformation of the plates and eliminate troubles that might arise from deformation of the plates. For example, when the fastener is used for securing together the bumper face and reinforcement on a front bumper, the fastener is broken at the time of the impact, so that the bumper face retreats without being greatly deformed. Thus, it is possible to eliminate breakage of the vehicle body and reduce repair costs.

What is claimed is:

1. A breaking type expansion fastener for fastening two plates in an overlapped state, comprising:
   a female member including a cylindrical portion, a flange portion extending radially outwardly from the upper end of said cylindrical portion; an annular collar portion of said cylindrical portion, formed under said flange portion; and a plurality of elastic leg portions defined by radially spaced slits and each having a radially inward projection projecting from the lower end of said cylindrical portion, said cylindrical portion being provided with a reduced thickness break portion having an outer diameter smaller than the outer diameter of said collar portion and adapted to extend along an overlap plane along which the two plates are overlapped; and
   a male member including a shaft portion for passing into said cylindrical portion of said female member, a head portion extending radially outwardly rom the upper end of said shaft portion and a leg portion expanding portion functioning, when said head portion is substantially aligned with the upper surface of said flange portion of said female member, to engage with said projections at the lower end of said elastic leg portions of said female member, a radially inwardly constricted break portion being provided between said shaft portion and head portion of said male member.

2. The expansion fastener according to claim 1, wherein said collar portion and said cylindrical portion of said female member are united in offset manner by said break portion.

* * * * *